(12) United States Patent
Jiao et al.

(10) Patent No.: US 12,028,942 B2
(45) Date of Patent: Jul. 2, 2024

(54) GATEWAY FOR INTERNET OF THINGS

(71) Applicant: BOE TECHNOLOGY GROUP CO., LTD., Beijing (CN)

(72) Inventors: Xingxing Jiao, Beijing (CN); Kui Wu, Beijing (CN); Jun Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 283 days.

(21) Appl. No.: 17/504,281

(22) Filed: Oct. 18, 2021

(65) Prior Publication Data
US 2022/0279623 A1 Sep. 1, 2022

(30) Foreign Application Priority Data
Feb. 26, 2021 (CN) .......................... 202110220725.1

(51) Int. Cl.
*H04L 12/28* (2006.01)
*H01Q 1/22* (2006.01)
(Continued)

(52) U.S. Cl.
CPC .......... *H04W 88/16* (2013.01); *H01Q 1/2291* (2013.01); *H04L 67/12* (2013.01); *H04W 4/80* (2018.02)

(58) Field of Classification Search
CPC ... H04L 29/06; H04L 45/00; H04L 29/06027; H04L 12/66; H04L 47/10; H04L 67/12; H04L 69/18; H04W 88/16; H04W 4/80; H04W 4/70; H01Q 1/2291; H01Q 5/385; H01Q 9/16; H01Q 21/28; H01Q 1/22; H01Q 1/521
See application file for complete search history.

(56) References Cited

U.S. PATENT DOCUMENTS 6,763,226 B1 * 7/2004 McZeal, Jr. .......... H04M 1/7243
455/575.1
10,756,433 B1 * 8/2020 Channabasappa ....... H01Q 1/38
(Continued)

FOREIGN PATENT DOCUMENTS

AT          521894 B1 *   5/2023   ............. E01B 21/00

OTHER PUBLICATIONS

Kwasniewski (AT-521894-B1), English Machine Translation, May 2023, pp. 1-6.*

*Primary Examiner* — Phuongchau Ba Nguyen
(74) *Attorney, Agent, or Firm* — Myers Bigel, P.A.

(57) ABSTRACT

A gateway for Internet of Things including a body, a main control board, and antenna components located on the body and including a short-range communication antenna component, a 5G antenna component and a Wi-Fi antenna component. The short-range communication antenna component, the main control board and the Wi-Fi antenna component are successively arranged on the body along a first direction of the body, a vertically upward direction of the body during the use of the gateway for Internet of Things being determined as the first direction of the body. A long-axis direction of the main control board is set parallel to the first direction of the body. The 5G antenna component includes at least one pair of two antennas arranged on both sides or the same side of a largest face of the main control board outside one or two sides along the first direction of the body.

13 Claims, 5 Drawing Sheets

(51) Int. Cl.
  *H04L 67/12* (2022.01)
  *H04W 88/16* (2009.01)
  *H04W 4/80* (2018.01)

(56) References Cited

U.S. PATENT DOCUMENTS

| | | | | |
|---|---|---|---|---|
| 2010/0182206 | A1* | 7/2010 | Barbieri | H01Q 21/28 |
| | | | | 343/893 |
| 2017/0044797 | A1* | 2/2017 | Colman | E05B 47/00 |
| 2017/0064491 | A1* | 3/2017 | Mirza | H04L 43/106 |
| 2021/0176805 | A1* | 6/2021 | Labadie | H04B 7/0413 |
| 2023/0177936 | A1* | 6/2023 | Tang | H01Q 1/2291 |

* cited by examiner

GATEWAY FOR INTERNET OF THINGS

RELATED APPLICATIONS

The present application claims the benefit of Chinese Patent Application No. 202110220725.1, filed on Feb. 26, 2021, the entire disclosure of which is incorporated herein by reference.

TECHNICAL FIELD

The disclosure relates to the field of Internet of Things technology, and in particular, to a gateway for Internet of Things.

BACKGROUND

An Internet-of-Things-gateway-class device is generally required to support multiple communication protocols to ensure that the gateway can meet various complex application scenarios. To guarantee implementation of various communication protocols, it is required to arrange corresponding antennas in a gateway for Internet of Things, and a reasonable layout between the various antennas is critical to the gateway for Internet of Things.

SUMMARY

In view of this, an embodiment of the disclosure proposes a gateway for Internet of Things.

An embodiment of the disclosure provides a gateway for Internet of Things comprising:
  a body for holding components of the gateway for Internet of Things;
  a main control board for controlling operations of the gateway for Internet of Things; and
  antenna components located on the body and comprising a short-range communication antenna component, a 5G antenna component and a Wi-Fi antenna component, the short-range communication antenna component, the 5G antenna component and the Wi-Fi antenna component being electrically coupled with terminals of corresponding communication modules on the main control board, respectively;
  wherein the short-range communication antenna component, the main control board and the Wi-Fi antenna component are successively arranged on the body along a first direction of the body, a vertically upward direction of the body during the use of the gateway for Internet of Things being determined as the first direction of the body; a long-axis direction of the main control board is set parallel to the first direction of the body; and the 5G antenna component comprises at least one pair of two antennas arranged on both sides or on the same side of a largest face of the main control board, or outside one or two sides of the main control board along the first direction of the body.

BRIEF DESCRIPTION OF THE DRAWINGS

In order to more clearly illustrate the technical solutions in the disclosure or the prior art, the appended drawings needing to be used in the description of the embodiments or the prior art will be introduced briefly in the following. Obviously, the drawings in the following description are only some embodiments of the disclosure, and for the person having ordinary skills in the art, other drawings may also be obtained according to these drawings under the premise of not paying out undue experimentation.

DETAILED DESCRIPTION

To make the objectives, technical solutions and advantages clearer, the disclosure will be further described in detail in connection with the specific embodiments and with reference to the drawings. It needs to be noted that, the technical terminology or the scientific terminology used in the disclosure should have the general meanings understood by the person having general skills in the art that the disclosure belongs to. The "first", "second" and similar words used in the disclosure do not mean any order, number or importance, but are just used to differentiate between different constituent parts. The word "comprise" or "comprised" or the like means that an element or article preceding the word encompasses the element or article listed behind the word and the equivalent thereof, without excluding other elements or articles. The word "connection" or "connected" or the like is not limited to a physical or mechanical connection, but may comprise an electrical connection, whether it is direct or indirect. The "up", "down", "left", or "right", etc. is just used for denoting a relative position relationship, and when the absolute position of a described object changes, the relative position relationship may also change correspondingly.

A multiple-protocol gateway for Internet of Things generally contains communication protocols such as Bluetooth, ZigBee, LoRa, Ethernet, etc. With the prevalence of 5G networks, a gateway-class device may introduce 5G technology to increase the number of access devices. How to ensure that after introducing 5G communication technology, the various wireless protocols can still work properly, and the various Internet of Things antennas do not interfere with each other, rationally conducting an antenna scheme layout is critical.

In view of this, an embodiment of the disclosure provides an gateway for Internet of Things comprising: a body for holding components of the gateway for Internet of Things; a main control board for controlling operations of the gateway for Internet of Things; and antenna components located on the body and comprising a short-range communication antenna component, a 5G antenna component and a Wi-Fi antenna component, the short-range communication antenna component, the 5G antenna component and the Wi-Fi antenna component being electrically coupled with terminals of corresponding communication modules on the main control board, respectively; wherein the short-range communication antenna component, the main control board and the Wi-Fi antenna component are successively arranged on the body along a first direction of the body, a vertically upward direction of the body during the use of the gateway for Internet of Things being determined as the first direction of the body; a long-axis direction of the main control board is set parallel to the first direction of the body; and the 5G antenna component comprises at least one pair of two antennas arranged on both sides or on the same side of a largest face of the main control board, or outside one or two sides of the main control board along the first direction of the body. The gateway for Internet of Things provided by the embodiment of the disclosure is suitable for multiple-protocol-Internet-of-Things-gateway-class devices, and by reasonably laying out the various antennas, a problem of interference between multiple antennas of a multiple-protocol gateway for Internet of Things may be at least mitigated or avoided.

Figure 1A:
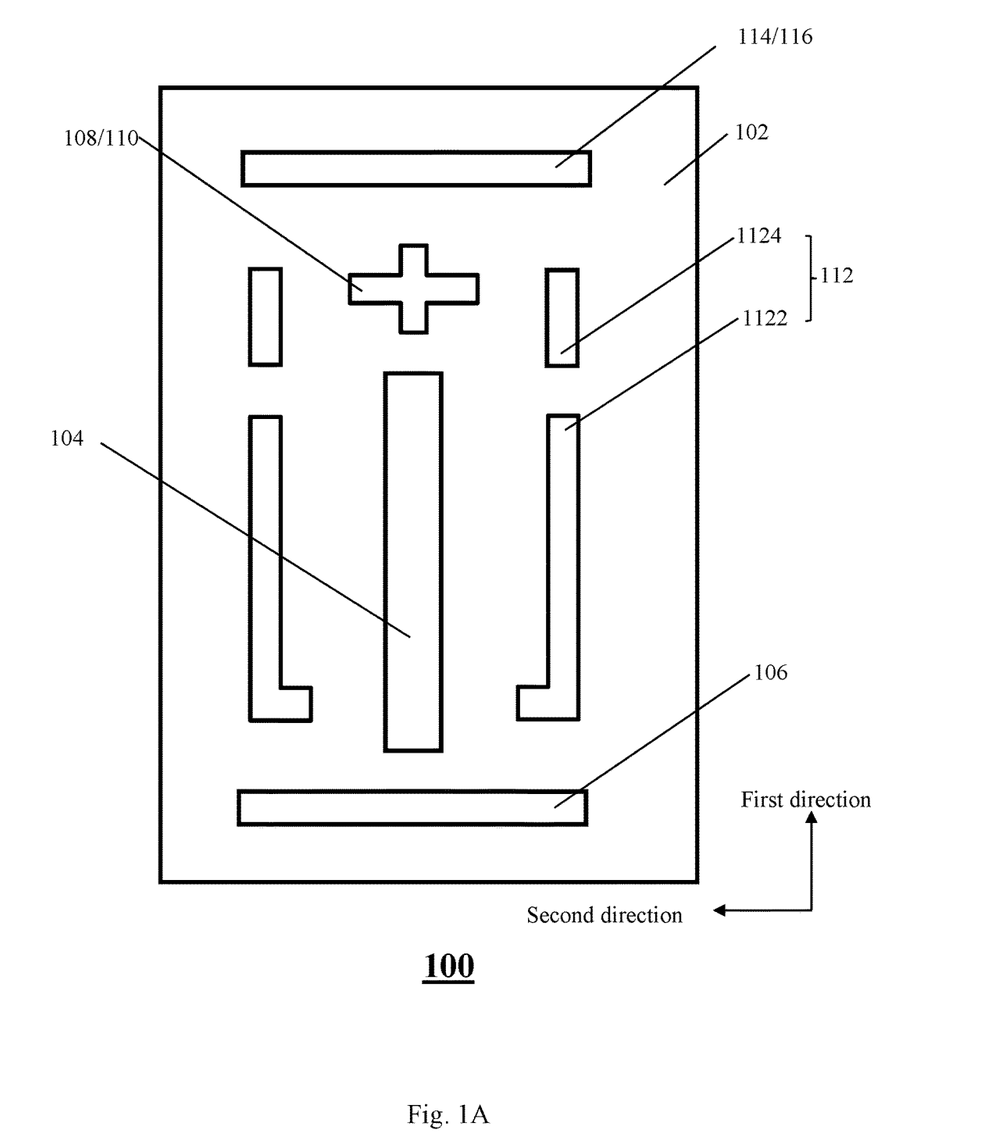
FIG. 1A shows a structure diagram of an exemplary gateway for Internet of Things provided by an embodiment of the disclosure.

FIG. 1A shows a structure diagram of an exemplary gateway for Internet of Things provided by an embodiment of the disclosure.

As shown in FIG. 1A, the gateway for Internet of Things 100 may comprise a body 102, a main control board 104 and antenna components. The body 102 may be used for holding various components of the gateway for Internet of Things 100. In some embodiments, the body 102 may further comprise a housing and a bracket, the bracket is arranged inside the housing, the bracket is used for implementing installation of the various components of the gateway 100, and the housing is arranged around the bracket and covers the various components inside it. In some embodiments, manufacturing material of the body 102 may be, for example, insulation ABS plastic, PLA plastic. In some embodiments, the gateway for Internet of Things 100 may further comprise an infrared module 116 which is electrically coupled with the main control board 104 and used for implementing infrared communication. In some embodiments, the gateway for Internet of Things 100 may further comprise an Ethernet interface 118 which is electrically coupled with the main control board 104. As an alternative to the wireless module, the Ethernet interface 118 deals with unexpected deterioration of the wireless network and inability to access the Internet. In addition, in some embodiments, the gateway for Internet of Things 100 may further comprise other types of interfaces, for example, an RS232 interface (not shown), to adapt to other types of communication protocols.

Both the main control board 104 and the antenna components may be arranged on the body 102 (e.g., may be arranged inside the housing of the body 102). The main control board 104 may comprise a CPU and a memory, and the main control board 104 coordinates work processes of the various modules and rationally allocates the CPU resource to ensure that the various modules work in order. In addition, on the main control board 104 may further be arranged communication modules corresponding to the individual antennas and terminals correspondingly electrically coupled with the individual antennas.

As shown in FIG. 1A, the antenna components may further comprise a short-range communication antenna component and a long-range communication antenna, for example, the antenna components may comprise a LoRa antenna 106, a Wi-Fi antenna component 108, a Bluetooth (BT) antenna 110, a 5G antenna component 112 and a ZigBee antenna 114, etc. Therein, the LoRa antenna 106 and the ZigBee antenna 114 are short-range communication antenna components, however, it may be appreciated that the short-range communication antenna component is not limited to the LoRa antenna 106 and the ZigBee antenna 114. For example, the short-range communication antenna component may further be an Ultra Wide Band (UWB) antenna, a Narrow Band Internet of Things (NB-IoT) antenna, etc. Therein, the 5G antenna component 112 and the Wi-Fi antenna component 108 may correspond to application scenarios of high frequency communication, and the LoRa antenna 106, the ZigBee antenna 114, the infrared module 116, and the Bluetooth antenna 110 may correspond to application scenarios of low frequency communication.

In some embodiments, a communication module corresponding to each of the antennas may be arranged in the gateway for Internet of Things 100. For example, communication modules of the LoRa antenna 106 and the 5G antenna component 112 may be arranged on the main control board 104. The communication module may further comprise a chip and peripheral circuit corresponding to the antenna, for example, the communication module of the LoRa antenna 106 may comprise a Semtech's 1278 chip and peripheral circuit.

Figure 1B:
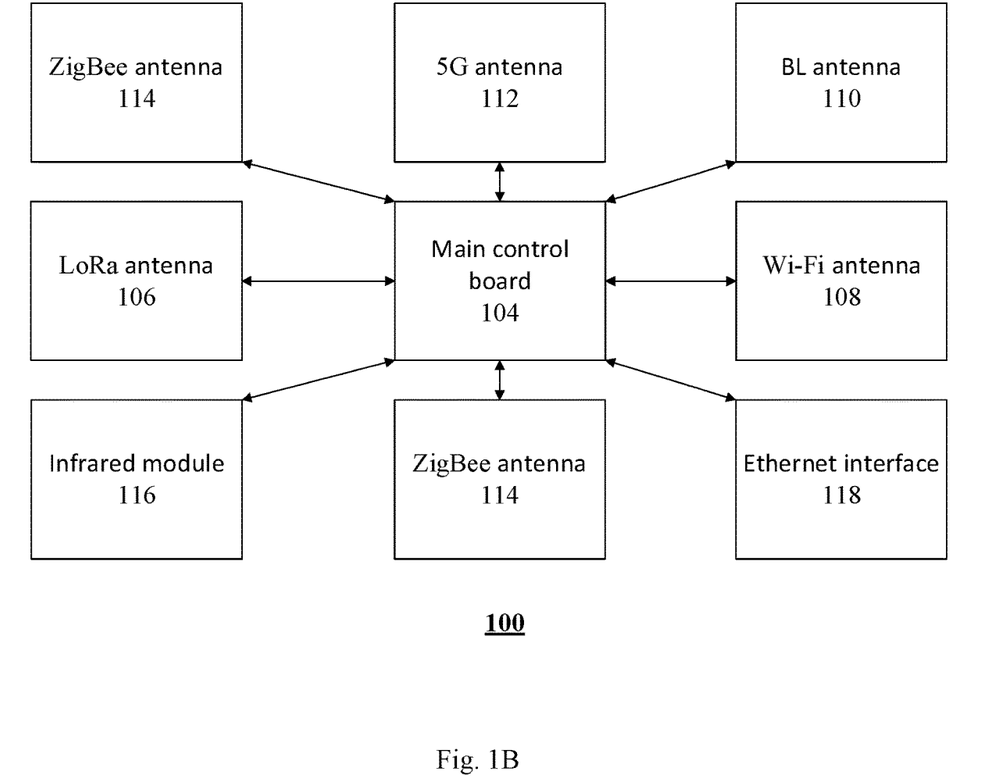
FIG. 1B shows a circuit structure diagram of an exemplary gateway for Internet of Things provided by an embodiment of the disclosure.

FIG. 1B shows a circuit structure diagram of an exemplary gateway for Internet of Things provided by an embodiment of the disclosure. As shown in FIG. 1B, the individual antennas in the antenna components may be electrically coupled with the main control board 104, respectively, thereby achieving electrical signal transmission with the main control board 104. In some embodiments, the individual antennas in the antenna components and the infrared module may take the form of a circuit module, and accordingly, interfaces electrically coupled with the individual modules may be reserved on the main control board 104.

As shown in FIG. 1A, the LoRa antenna 106, the main control board 104 and the Wi-Fi antenna component 108 may be successively arranged inside the body 102 along a first direction of the body 102. Assume that the body 102 of the gateway for Internet of Things 100 is a cylinder, the first direction may be the height direction of the body 102. Assume that the body 102 of the gateway for Internet of Things 100 is a cuboid, the first direction of the body may be a vertically upward direction of the body 102 during the use of the gateway for Internet of Things.

In general, a communication frequency of the LoRa antenna 106 is a low frequency, the space it occupies is large and its anti-interference ability is strong. Therefore, in some embodiments, the LoRa antenna 106 may be arranged at an end of the body 102 along the first direction. As shown in FIG. 1A, taking that the first direction is the vertical direction as an example, the LoRa antenna 106 may be arranged at the bottom of the body 102. Since the anti-interference ability of the LoRa antenna 106 is strong, arrangement at the bottom of the body 102 has a weak impact on its signal. In some embodiments, a ground wire of the LoRa antenna 106 may be grounded through a metal shell of the body 102, and thereby may improve the antenna efficiency of the LoRa antenna 106. Meanwhile, since the LoRa antenna 106 is arranged at the bottom of the body 102, the LoRa antenna 106 is more conveniently grounded.

In general, the volume of the main control board 104 is large. Therefore, for achieving a rational layout, as shown in FIG. 1A, the main control board 104 may be arranged at a center location of the body 102. As such, a space around the main control board 104 may be used for arranging the individual antennas and other modules.

Figure 2A:
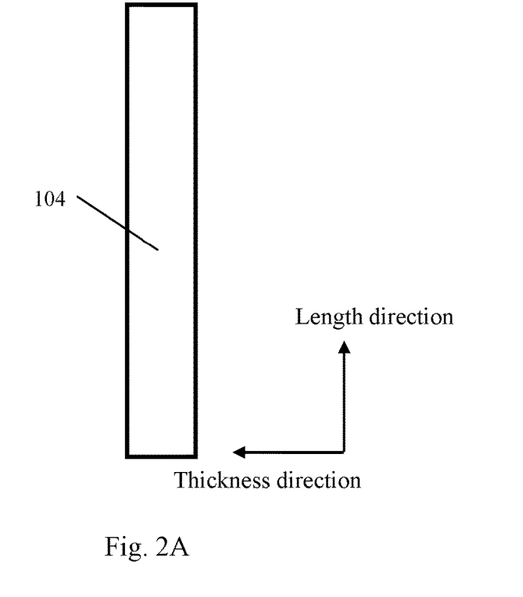
FIG. 2A shows a schematic diagram of an exemplary main control board according to an embodiment of the disclosure.

In some embodiments, as shown in FIG. 1A and FIG. 2A, a long-axis direction of the main control board 104 may be set as parallel to the first direction of the body 102, and a thickness direction of the main control board 104 (i.e., a direction perpendicular to a largest face of the main control board 104) may be set parallel to a second direction of the body 102. The second direction is the thickness direction of the main control board 104 and it is perpendicular to the first direction.

Note that here the main control board is generally considered as rectangular, and therefore has a long axis and a short axis. However, in some examples, the main control board may be square, and then an axis parallel to one side thereof may be called the long axis, and an axis parallel to a neighboring side is called the short axis.

In some embodiments, as shown in FIG. 1A, taking that the first direction is the vertical direction as an example, the Wi-Fi antenna component 108 may be arranged on an upper part of the body 102 and located above the main control board 104. In general, a communication frequency of the Wi-Fi antenna component 108 is high, its anti-interference ability is thus weak and it is necessary to prevent other objects from obstructing its signal. The embodiment arranges the Wi-Fi antenna component 108 above the main control board 104 and prevents the main control board 104 from obstructing its signal. In some embodiments, the Wi-Fi antenna component 108 may comprise a Wi-Fi antenna module and a Wi-Fi antenna, the Wi-Fi antenna is attached to the Wi-Fi antenna module, and the attachment position may be selected according to the actual needs.

In some embodiments, as shown in FIG. 1A, inside the body 102, the LoRa antenna 106, the 5G antenna component 112 and the Wi-Fi antenna component 108 are successively arranged along the first direction, wherein the position of the Wi-Fi antenna needs to be higher than the 5G antenna component 112. Therefore, when attaching the Wi-Fi antenna to the Wi-Fi antenna module, the position of the Wi-Fi antenna needs to be considered to make its attachment position higher than the 5G antenna component 112, for example, near the top of the Wi-Fi antenna component 108. In some embodiments, the orthographic projection of the LoRa antenna 106, the 5G antenna and the Wi-Fi antenna in the first direction may be coincident or partially coincident, which is thus beneficial to improve the structural compactness of the gateway for Internet of Things 100 to reduce the volume as far as possible.

In some embodiments, the number of Wi-Fi antennas in the Wi-Fi antenna component 108 may be more than one, for example, may be two. As such, two Wi-Fi antennas may be symmetrically arranged on both sides of the Wi-Fi antenna component 108. By arranging two Wi-Fi antennas, it is beneficial to improve signal intensity, increase signal transmission and reception directions, and expand the range of transmission and reception.

In some embodiments, as shown in FIG. 1A, the 5G antenna component 112 may comprise at least one pair of two 5G antennas (e.g., 5G main antennas) arranged on both sides or on the same side of a largest face of the main control board 104, or outside one or two sides of the main control board 104 along the first direction of the body. When the two 5G antennas are arranged on the same side of the main control board 104, to improve the structural compactness, the two 5G antennas may be rotationally symmetrically distributed, that is, one antenna will coincide with the other antenna after being rotated around a fixed point by a (radians). The fixed point is called a center of rotational symmetry, and the angle of rotation is called a rotational angle ($0°<\alpha<360°$). When the two 5G antennas are arranged on both sides of the main control board 104, to improve the structural compactness, for example, the two 5G antennas may be symmetrically arranged on both sides of the main control board 104, and the two 5G antennas are disposed along the thickness direction of the main control board 104 (as shown in FIG. 2A), that is, a set of 5G antennas are arranged outside two largest faces of the main control board 104, respectively. This is because the volume a 5G antenna occupies as a whole is large, outside spaces of the two largest faces of the main control board 104 are also large, and arranging the 5G antennas outside the two largest faces of the main control board 104 may save the interior layout space of the gateway for Internet of Things 100. The outside of a face of the main control board refers to one side facing away from the main control board 104. In some embodiments, heat dissipation material may be arranged on a lateral side of the main control board 104, and thereby heat given out by the 5G antenna may be dissipated as soon as possible. Here, the lateral side of the main control board 104 generally refers to a long side or a short side.

In some embodiments, the 5G antenna component 112 is not directly arranged on the main control board 104, but arranged on the bracket of the body 102. For example, the main control board 104 is arranged on the bracket, the 5G antenna component 112 is also arranged on the bracket, it is thereby mitigated or avoided that the heat given out by the 5G antennas affects the operation of the main control board 104, and it is also beneficial to improve the stability of the 5G antennas.

In some embodiments, as shown in FIG. 1A, the 5G antenna component 112 may further comprise two pairs of four antennas located on both sides or on the same side of a largest face of the main control board 104, or outside one or two sides of the main control board 104 along the first direction of the body. By arranging pairs of 5G antennas, it is beneficial to improve signal intensity, increase signal transmission and reception directions, and expand the range of transmission and reception.

For example, the 5G antenna component 112 may comprise a 5G main antenna component and a 5G auxiliary antenna component. The 5G main antenna component may comprise two 5G main antennas 1122 on the bracket located on both sides or on the same side of a largest face of the main control board 104, or outside one or two sides of the main control board 104 along the first direction of the body, and the 5G auxiliary antenna component may comprise two 5G auxiliary antennas 1124 on the bracket located on both sides or on the same side of a largest face of the main control board 104, or outside one or two sides of the main control board 104 along the first direction of the body. As shown in FIG. 1A, the 5G main antenna component and the 5G auxiliary antenna component may be successively disposed along the first direction of the body 102. Therein, a range of communication frequencies of the 5G main antennas 1122 may be 700 MHz~3 GHz, and a range of communication frequencies of the 5G auxiliary antennas 1124 may be 3 GHz~6 GHz. Thus, it can be seen that the communication frequencies of the 5G main antennas 1122 are low, whereas the communication frequencies of the 5G auxiliary antennas 1124 are high. Accordingly, the anti-interference ability of the 5G main antennas 1122 is strong, and the anti-interference ability of the 5G auxiliary antennas 1124 is weak.

Correspondingly, the volume of the 5G main antennas 1122 is large, and the volume of the 5G auxiliary antennas 1124 is small.

In some embodiments, the two 5G main antennas 1122 may be symmetrically arranged on both sides of the main control board 104. As such, since the volume of the 5G main antennas 1122 is large, it is possible to well utilize the outside spaces of the two largest faces of the main control board 104. Meanwhile, since the anti-interference ability of the 5G main antennas 1122 is strong, they are arranged on both sides of the main control board 104 and the obstruction from the main control board 104 to them is small. For example, a signal sent out by a 5G main antenna 1122 may bypass the main control board 104 and be emitted outside.

Figure 2B:
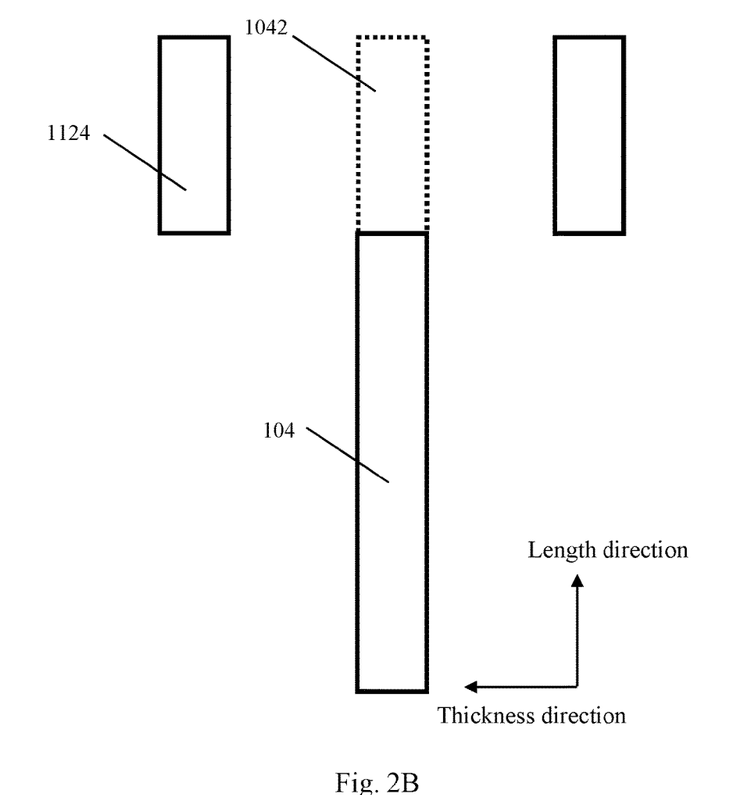
FIG. 2B shows a schematic diagram of a positional relationship between the main control board and a 5G auxiliary antenna according to an embodiment of the disclosure.

Since the anti-interference ability of the 5G auxiliary antennas 1124 is weak, to ensure that their signals are not obstructed by the main control board 104, as shown in FIG. 2B, the two 5G auxiliary antennas 1124 may be symmetrically arranged on both sides of a virtual extended portion 1042 of the main control board 104. The virtual extended portion 1042 is an extended portion that can be formed assuming the main control board 104 is extended along its long-axis direction. In some embodiments, as shown in FIG. 1A, the Wi-Fi antenna component 108 may be arranged between the two 5G auxiliary antennas 1124.

In some embodiments, as shown in FIG. 1A, to improve the compactness, the Bluetooth antenna 110 and the Wi-Fi antenna component 108 may be integrated into a whole, for example, the Bluetooth antenna 110 may be attached to the Wi-Fi antenna module. In some embodiments, the module of the ZigBee antenna 114 and the infrared module 116 may also be integrated into a whole.

In some embodiments, the ZigBee antenna 114 and the infrared module 116 may be arranged on one side of the Wi-Fi antenna component 108 facing away from the main control board 104. For example, taking that the first direction is the vertical direction as an example, the ZigBee antenna 114 and the infrared module 116 may be arranged on the top of the body 102. In some embodiments, a long-axis direction of the ZigBee antenna 114 and the infrared module 116 may be parallel to the second direction of the body 102. As such, arranging the ZigBee antenna 114 and the infrared module 116 with a large volume on the top of the body 102 laterally may reduce the hindrance of the ZigBee antenna 114 and the infrared module 116 to the arrangement of other antennas.

In some embodiments, antenna forms of adjacent antennas may be different, and thereby signal interference between adjacent antennas may be reduced.

Figure 2C:
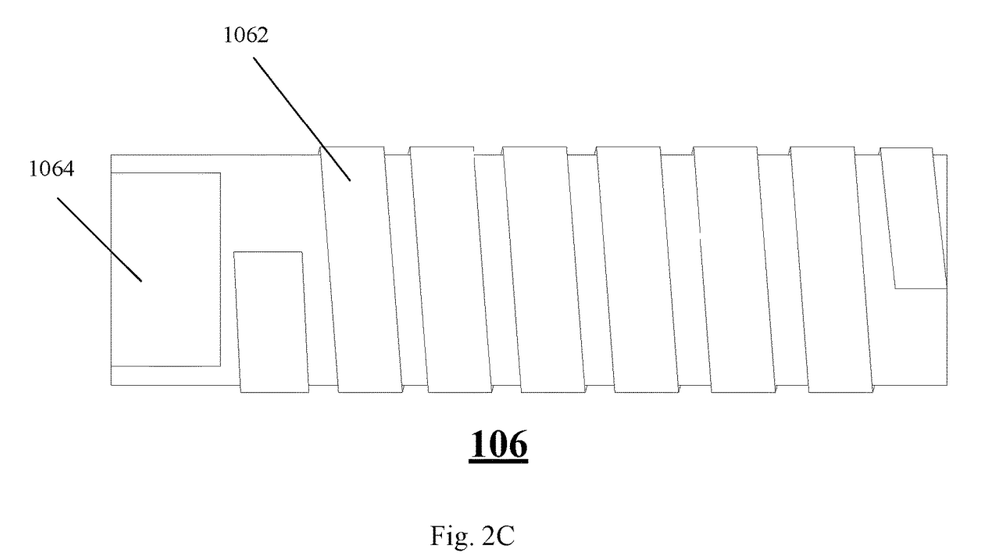
FIG. 2C shows a structure diagram of an exemplary LoRa antenna according to an embodiment of the disclosure.

For example, as shown in FIG. 2C, the antenna form of the LoRa antenna 106 may be a form of an annular antenna, which comprises a radiation body 1062 and a ground wire 1064.

Figure 2D:
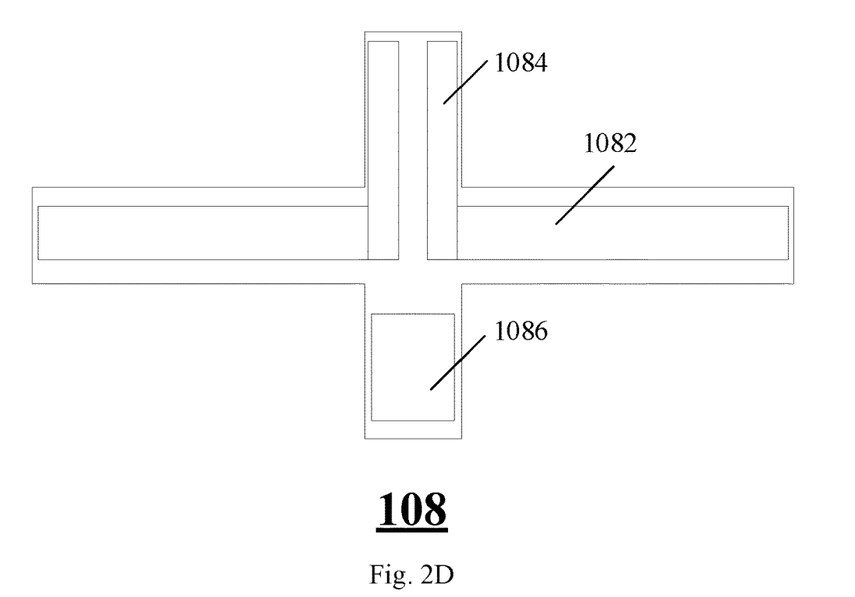
FIG. 2D shows a structure diagram of an exemplary Wi-Fi antenna according to an embodiment of the disclosure.

As another example, as shown in FIG. 2D, the antenna form of the Wi-Fi antennas of the Wi-Fi antenna component 108 may be a form of a dipole antenna, which comprises a first radiation body 1082 in the horizontal direction, a second radiation body 1084 in the vertical direction and a ground wire 1086. The first radiation body 1082 is a 2.4 GHz frequency band antenna, and the second radiation body 1084 is a 5 GHz frequency band antenna. Similarly, the Bluetooth antenna 110 may also be in a form of a dipole antenna.

Figure 2E:
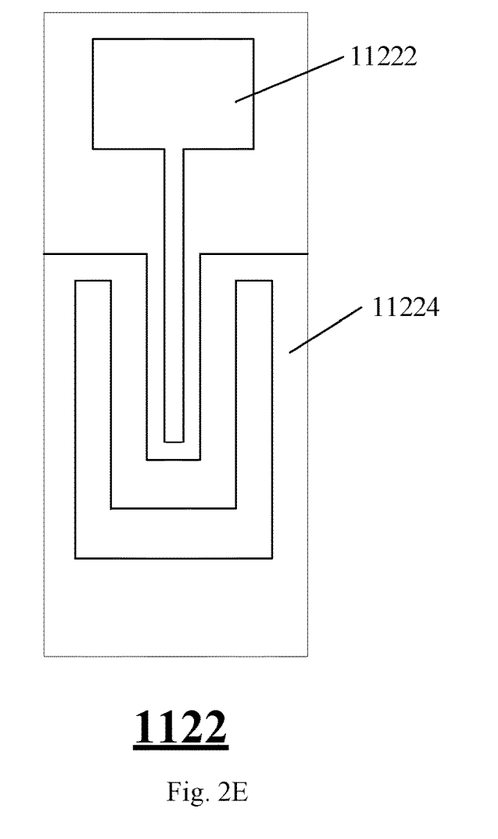
FIG. 2E shows a structure diagram of an exemplary 5G main antenna according to an embodiment of the disclosure.
Figure 2F:
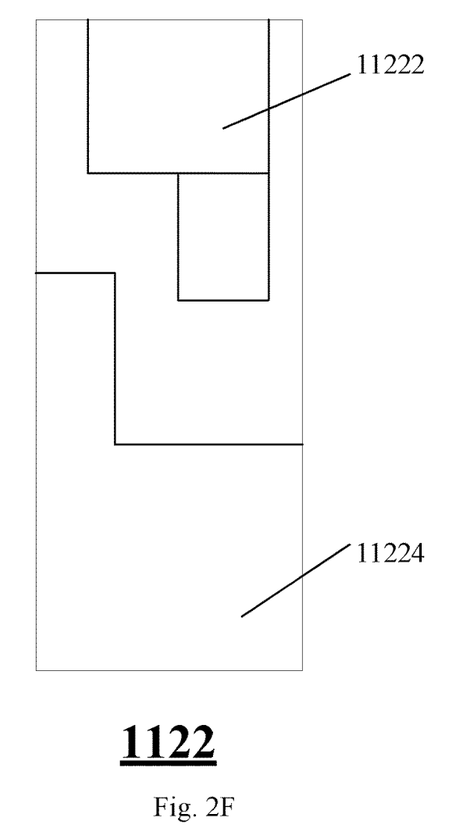
FIG. 2F shows a structure diagram of another exemplary 5G main antenna according to an embodiment of the disclosure.

As still another example, as shown in FIG. 2E, the antenna form of the 5G main antennas 1122 may be a form of a dipole antenna, which comprises a radiation body 11222 and a ground wire 11224. As shown in FIG. 2F, the antenna form of the 5G main antennas 1122 may also be a form of a plane inverted F antenna (PIFA). In some embodiments, the antenna form of the 5G auxiliary antennas 1124 may be a form of an annular antenna.

Figure 2G:
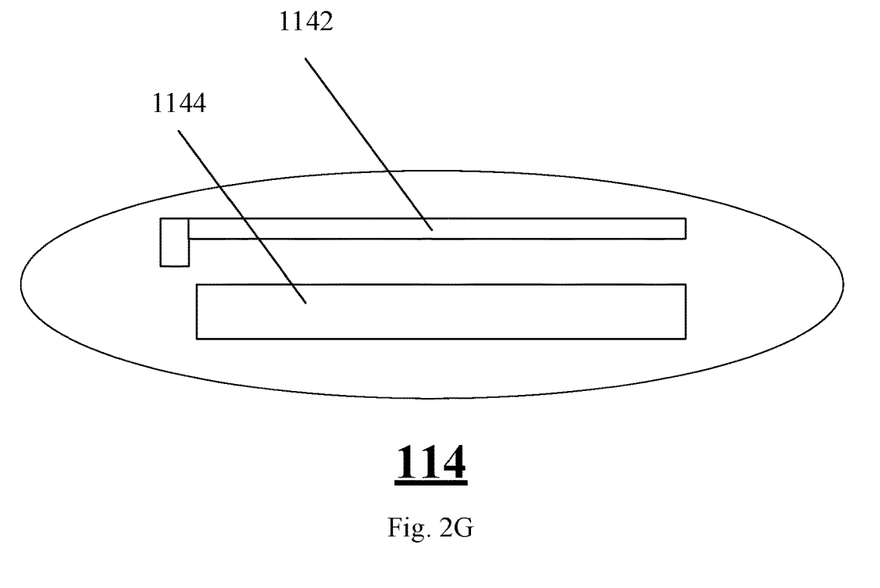
FIG. 2G shows a top-view structure diagram of an exemplary ZigBee antenna according to an embodiment of the disclosure.

As yet still another example, FIG. 2G shows a top-view structure diagram of an exemplary ZigBee antenna according to an embodiment of the disclosure (with reference to FIG. 1A as the front view direction). The antenna form of the ZigBee antenna 114 may be a form of a plane inverted F antenna (PIFA), which comprises an L-shaped radiation body 1142 and a ground wire 1144.

It may be appreciated that the antenna forms employed by the above individual antennas are just exemplary, and the antenna forms of the individual antennas may be changed and are not limited to those given in the above embodiments under the premise of satisfying the inventive concepts of the embodiments.

It may be appreciated by the person having skills in the art that the radiation bodies and the corresponding ground wires of the above individual antennas may be connected by radio frequency wires.

In some embodiments, it is possible to make the antennas meet a certain distance requirement to reduce signal interference between the antennas.

For example, along the first direction, a range of side to side distances between the 5G auxiliary antennas 1124 and the 5G main antennas 1122 may be 30~50 mm, a range of side to side distances between the 5G main antennas 1122 and the LoRa antenna 106 may be greater than 70 mm, and a range of side to side distances between the Wi-Fi antennas of the Wi-Fi antenna component 108 and the 5G auxiliary antennas 1124 may be 15~30 mm.

As another example, along the thickness direction of the main control board 104 (the second direction of the body 102), a range of side to side distances between the Wi-Fi antennas of the Wi-Fi antenna component 108 and the 5G auxiliary antennas 1124 may be 15~30 mm, and a range of side to side distances between the 5G main antennas 1122 and the main control board 104 may be greater than 30 mm.

As still another example, along the first direction, a range of side to side distances between the infrared module 116 and the Wi-Fi antennas of the Wi-Fi antenna component 108 may be 30~50 mm.

It needs to be noted that, the side to side distance may refer to a shortest distance between sides of two modules closest to each other. It may be appreciated that the above ranges of distances between the individual modules are just exemplary, and the ranges of distances between the individual modules may be changed and are not limited to those given in the above embodiments under the premise of satisfying the inventive concepts of the embodiments.

It should be appreciated by the person having ordinary skills in the art that, the discussion of any of the above embodiments is only exemplary, and is not intended to imply that the scope of the disclosure (comprising the claims) is limited to these examples, and in the concept of the disclosure, the above embodiments or the technical features in different embodiments may also be combined, the steps may be realized in any order, and many other changes of the different aspects of the disclosure as described above exist, which are not provided in detail for simplicity.

In addition, for simplifying description and discussion, and in order not to make the disclosure difficult to understand, well-known power/ground connections with an integrated circuit (IC) chip and other components may be or may not be shown in the provided drawings. In addition, apparatuses may be shown in the form of block diagram, to avoid making the disclosure difficult to understand, and this also considers the fact that the implementation details about these block diagram apparatuses highly depend on a platform which will implement the disclosure (that is, these details should be completely within the understanding of the person having skills in the art). In a case in which particular details (e.g., circuits) have been set forth to describe the exemplary embodiments of the disclosure, it is evident to the person having skills in the art that the disclosure may be implemented without these particular details or with these particular details being changed. Therefore, the description should be considered illustrative rather than limiting.

Although the disclosure has been described in conjunction with the specific embodiments of the disclosure, many alternatives, modifications and variations of these embodiments will be obvious to the person having ordinary skills in the art according to the foregoing description. For example, other storage architectures (e.g., a dynamic RAM (DRAM)) may use the discussed embodiments.

The disclosure is intended to cover all such alternatives, modifications and variations which fall within the broad scope of the appended claims. Therefore, within the spirit and principles of the disclosure, any omissions, modifications, equivalent substitutions, improvements, etc. that are made should all be encompassed in the protection scope of the disclosure.

The invention claimed is:

1. A gateway for Internet of Things comprising:
   a body configured to hold components of the gateway for Internet of Things;
   a main control board configured to control operations of the gateway for Internet of Things; and
   antenna components located on the body and comprising a short-range communication antenna component, a 5G antenna component and a Wi-Fi antenna component, the short-range communication antenna component, the 5G antenna component and the Wi-Fi antenna component being electrically coupled with terminals of corresponding communication modules on the main control board, respectively,
   wherein the short-range communication antenna component, the main control board and the Wi-Fi antenna component are successively arranged on the body along a first direction of the body,
   wherein a vertically upward direction of the body during the use of the gateway for Internet of Things being determined as the first direction of the body,
   wherein a long-axis direction of the main control board is set parallel to the first direction of the body,
   wherein the 5G antenna component comprises at least a 5G main antenna component and a 5G auxiliary antenna component, the body comprises a bracket, the main control board is arranged on the bracket, and the 5G antenna component is also arranged on the bracket,
   wherein the 5G main antenna component comprises two 5G main antennas on the bracket located on both sides or on a same side of a largest face of the main control board outside one or two sides along the first direction of the body, and the 5G auxiliary antenna component comprises two 5G auxiliary antennas on the bracket located on both sides or on the same side of the largest face of the main control board outside one or two sides along the first direction of the body, and
   wherein the 5G main antenna component and the 5G auxiliary antenna component are successively disposed along the first direction of the body.

2. The gateway for Internet of Things as claimed in claim 1, wherein the Wi-Fi antenna component is between the two 5G auxiliary antennas.

3. The gateway for Internet of Things as claimed in claim 1, wherein antenna forms of adjacent antennas are different.

4. The gateway for Internet of Things as claimed in claim 1,
   wherein the antenna form of the 5G main antennas is a form of a dipole antenna or a form of a plane inverted F antenna, and
   wherein the antenna form of the 5G auxiliary antennas is a form of an annular antenna.

5. The gateway for Internet of Things as claimed in claim 1, further comprising an Ethernet interface which is electrically coupled with the main control board.

6. The gateway for Internet of Things as claimed in claim 1, wherein the antenna components further comprise a Bluetooth antenna, and the Bluetooth antenna and the Wi-Fi antenna component are integrated into a whole.

7. The gateway for Internet of Things as claimed in claim 6, wherein the antenna form of the Bluetooth antenna is a form of a dipole antenna.

8. The gateway for Internet of Things as claimed in claim 1,
   wherein the short-range communication antenna component is a LoRa antenna,
   wherein the antenna components further comprise a ZigBee antenna,
   wherein the gateway for Internet of Things further comprises an infrared module, and the infrared module is electrically coupled with the main control board, and
   wherein a ZigBee module of the ZigBee antenna and the infrared module are integrated into a whole and arranged on one side of the Wi-Fi antenna component facing away from the main control board.

9. The gateway for Internet of Things as claimed in claim 8, wherein the antenna form of the LoRa antenna is a form of an annular antenna, and
   wherein the antenna form of Wi-Fi antennas of the Wi-Fi antenna component is a form of a dipole antenna.

10. The gateway for Internet of Things as claimed in claim 8, wherein the antenna form of the ZigBee antenna is a form of a plane inverted F antenna.

11. The gateway for Internet of Things as claimed in claim 8, wherein along the first direction, a side to side distance between the infrared module and the Wi-Fi antenna component is 30~50 mm.

12. The gateway for Internet of Things as claimed in claim 1, wherein along the first direction, side to side distances between the 5G auxiliary antennas and the 5G main antennas are 30~50 mm, side to side distances between the 5G main antennas and the short-range communication antenna component are greater than 70 mm, and side to side distances between the Wi-Fi antenna component and the 5G auxiliary antennas are 15~30 mm.

13. The gateway for Internet of Things as claimed in claim 12, wherein along a thickness direction of the main control board, side to side distances between the Wi-Fi antenna component and the 5G auxiliary antennas are 15~30 mm, and side to side distances between the 5G main antennas and the main control board are greater than 30 mm.

* * * * *